US012614081B2

(12) United States Patent
Guinovart Gràcia

(10) Patent No.: US 12,614,081 B2
(45) Date of Patent: Apr. 28, 2026

---

(54) FRACTAL COGNITIVE COMPUTING NODE, COMPUTER-IMPLEMENTED METHOD FOR LEARNING PROCEDURES, COMPUTATIONAL COGNITION CLUSTER AND COMPUTATIONAL COGNITION ARCHITECTURE

(71) Applicant: Avatar Cognition Barcelona, SL, Barcelona (ES)

(72) Inventor: Enric Guinovart Gràcia, Barcelona (ES)

(73) Assignee: AVATAR COGNITION BARCELONA, SL, Barcelona (ES)

( * ) Notice: Subject to any disclaimer, the term of this patent is extended or adjusted under 35 U.S.C. 154(b) by 1117 days.

(21) Appl. No.: 17/427,467

(22) PCT Filed: Jan. 31, 2020

(86) PCT No.: PCT/EP2020/052447
§ 371 (c)(1),
(2) Date: Jul. 30, 2021

(87) PCT Pub. No.: WO2020/157284
PCT Pub. Date: Aug. 6, 2020

(65) Prior Publication Data
US 2022/0129773 A1      Apr. 28, 2022

(30) Foreign Application Priority Data
Jan. 31, 2019    (EP) ..................................... 19382063

(51) Int. Cl.
G06N 5/022        (2023.01)
G06F 15/173       (2006.01)
(Continued)

(52) U.S. Cl.
CPC ....... G06N 5/022 (2013.01); *G06F 15/17362* (2013.01); *G06F 18/24323* (2023.01);
(Continued)

(58) Field of Classification Search
CPC ........ G06N 5/022; G06N 3/098; G06N 5/045; G06N 20/00; G06N 20/20;
(Continued)

(56) References Cited

U.S. PATENT DOCUMENTS 7,567,889 B2    7/2009  Wismüller
9,239,989 B2    1/2016  Bouqata et al.
(Continued)

FOREIGN PATENT DOCUMENTS

WO     WO-2019148315 A1 *  8/2019    ......... G06F 16/3329

OTHER PUBLICATIONS

Lee et al., "Set Transformer: A framework for Attention-based Permutation-Invariant Neural Networks" Jan. 24, 2019, arXiv: 1810.00825v2, pp. 1-17. (Year: 2019).*
(Continued)

*Primary Examiner* — Vincent Gonzales
*Assistant Examiner* — Chase P. Hinckley
(74) *Attorney, Agent, or Firm* — Ruggiero McAllister & McMahon LLC

(57)          ABSTRACT

A fractal cognitive computing node, a computer-implemented method for learning procedures, a computational cognition cluster, and a computational cognition architecture are provided. The FCN comprises a first input to receive a first input signal, a first output to provide a first output signal, a second input to receive a second input signal and a third input signal to receive a SA parameter. A memory of the FCN stores a collection of items. A processing unit implements a function that compares a combination of said first and second input signals with the stored collection and
(Continued)

calculates a similarity measure for each compared item. The first output signal is calculated as a selection of the compared items having a similarity measure greater than said SA parameter. If the selection is empty, a new item is added to said memory. If not empty, the first output signal is set to said selection.

18 Claims, 7 Drawing Sheets

(51) Int. Cl.

| | |
|---|---|
| *G06F 18/243* | (2023.01) |
| *G06N 3/098* | (2023.01) |
| *G06N 5/045* | (2023.01) |
| *G06N 20/00* | (2019.01) |
| *G06N 20/20* | (2019.01) |
| *G06V 10/74* | (2022.01) |
| *G06V 10/762* | (2022.01) |
| *G06V 30/19* | (2022.01) |

(52) U.S. Cl.
CPC ............. *G06N 3/098* (2023.01); *G06N 5/045* (2013.01); *G06N 20/00* (2019.01); *G06N 20/20* (2019.01); *G06V 10/761* (2022.01); *G06V 10/7625* (2022.01); *G06V 30/19093* (2022.01)

(58) Field of Classification Search
CPC ........ G06F 15/17362; G06F 18/24323; G06V 10/761; G06V 10/7625; G06V 30/19093
See application file for complete search history.

(56) References Cited

U.S. PATENT DOCUMENTS

| | | | | |
|---|---|---|---|---|
| 9,336,774 | B1 | 5/2016 | Kurzweil | |
| 9,524,461 | B1 | 12/2016 | Huynh | |
| 10,635,967 | B2 | 4/2020 | Aparicio | |
| 10,719,764 | B2 | 7/2020 | Shazeer et al. | |
| 11,157,631 | B1* | 10/2021 | Whelton | H04L 9/0861 |
| 2017/0013058 | A1* | 1/2017 | Annamalai | H04L 5/0055 |
| 2018/0203916 | A1* | 7/2018 | Rafsky | G06F 16/285 |
| 2018/0357240 | A1* | 12/2018 | Miller | G06N 5/022 |
| 2019/0130213 | A1* | 5/2019 | Shazeer | G06V 10/56 |
| 2019/0318249 | A1* | 10/2019 | Xu | G06N 3/045 |
| 2019/0354567 | A1* | 11/2019 | Dehghani | G06N 3/0895 |
| 2019/0354858 | A1* | 11/2019 | Chrzanowski | G06N 20/00 |
| 2019/0370241 | A1* | 12/2019 | Miraldo | H04L 9/0643 |
| 2020/0050638 | A1* | 2/2020 | Hancock | G06F 16/90344 |
| 2020/0104681 | A1* | 4/2020 | Li | G06N 3/045 |
| 2020/0110800 | A1* | 4/2020 | Astigarraga | G06F 40/289 |
| 2020/0117906 | A1* | 4/2020 | Lee | G06V 10/764 |
| 2020/0134804 | A1* | 4/2020 | Song | G06V 10/764 |
| 2020/0160153 | A1* | 5/2020 | Elmoznino | G06T 19/006 |
| 2021/0109956 | A1* | 4/2021 | Su | G06N 5/025 |
| 2021/0201147 | A1* | 7/2021 | Tu | G06F 18/2148 |
| 2021/0326389 | A1* | 10/2021 | Sankar | G06N 20/10 |
| 2021/0334320 | A1* | 10/2021 | Faust | G06F 16/954 |
| 2021/0374530 | A1* | 12/2021 | Mahkonen | G06N 3/10 |
| 2022/0035675 | A1* | 2/2022 | Guinovart | G06N 3/088 |

OTHER PUBLICATIONS

Su et al., "Learning Visual Knowledge Memory Networks for Visual Question Answering" Jun. 13, 2018, arXiv: 1806.04860v1, pp. 1-10. (Year: 2018).*

Cai et al., "Memory Matching Networks for One-Shot Image Recognition" Apr. 23, 2018, arXiv: 1804.08281v1, pp. 1-9. (Year: 2018).*

Dou et Zhang, "Hierarchical Attention: What Really Counts in Various NLP tasks" Aug. 10, 2018, arXiv: 1808.03728v1, pp. 1-9. (Year: 2018).*

Sankar et al., "Dynamic Graph Representation Learning via Attention Networks" Sep. 26, 2018, U.S. Appl. No. 62/736,953, pp. 1-56. (Year: 2018).*

Elmoznino et al., "System and Method for Augmented Reality by Translating an Image using Conditional Cycle-Consistent Generative Adversarial Networks (ccGANs)" Nov. 15, 2018, U.S. Appl. No. 62/767,769, pp. 1-37. (Year: 2018).*

Guo et al., "Deep Learning for Reward Design to Improve Monte Carlo Tree Search in Atari Games" Apr. 24, 2016, arXiv: 1604.07095v1, pp. 1-7. (Year: 2016).*

Ding et al., "Coherence-Aware Neural Topic Modeling" Sep. 7, 2018, arXiv: 1809.02687v1, pp. 1-7. (Year: 2018).*

Piergiovanni et al., "Learning Latent Subevents in Activity Videos Using Temporal Attention Filters" 2017, pp. 4247-4254. (Year: 2017).*

Roohitavaf et Kulkarni, "DVKF: A Framework for Rapid Prototyping and Evaluating Distributed Key-Value Stores" Jan. 15, 2018, arXiv: 1801.05064v1, pp. 1-15. (Year: 2018).*

Belleti et al., "Scalable Realistic Recommendation Datasets through Fractal Expansions" Jan. 23, 2019, arXiv: 1901.08910v1, pp. 1-11. (Year: 2019).*

Larsson et al., "FractalNet: Ultra-deep Neural Networks Without Residuals" May 26, 2017, arXiv: 1605.07648v4, pp. 1-11. (Year: 2017).*

Perez et al., "On the Turing Completeness of Modern Neural Network Architectures" Jan. 10, 2019, arXiv: 1901.03429v1, pp. 1-36. (Year: 2019).*

Anwar et al., "BespoKV: Application Tailored Scale-Out Key-Value Stores" Nov. 2018, pp. 1-16. (Year: 2018).*

Zhang et al., "A distributed in-memory key-value store system on heterogeneous CPU-GPU cluster" Aug. 21, 2017, pp. 729-750. (Year: 2017).*

Kim et al., "Attentive Neural Processes" Jan. 17, 2019, arXiv: 1901.05761v1, pp. 1-18. (Year: 2019).*

European Search Report for European priority application EP 19 38 2063, 7 pages, dated Jul. 12, 2019.

Rodriguez et al."Detecting Performance Anamolies in Scientific Workflows Using Hierarchical Temporal Memory", Future Generations Computer Systems, vol. 88, pp. 624-635 , Nov. 1, 2018, Elsevier.

International Search Report for corresponding international application PCT/EP2020/052447, 13 pages, dated Feb. 20, 2020.

Written Opinion of the International Preliminary Examining Authority for corresponding international application PCT/EP2020/052447, 9 pages, dated Jul. 1, 2020.

International Preliminary Report on Patentability for corresponding international application PCT/EP2020/052447, 40 pages, dated Oct. 1, 2020.

* cited by examiner 221    212

FRACTAL COGNITIVE COMPUTING NODE, COMPUTER-IMPLEMENTED METHOD FOR LEARNING PROCEDURES, COMPUTATIONAL COGNITION CLUSTER AND COMPUTATIONAL COGNITION ARCHITECTURE

CROSS REFERENCE TO RELATED APPLICATIONS

This application is a national stage U.S. patent application of International Application No. PCT/EP2020/052447, filed on Jan. 31, 2020, and claims foreign priority to European Patent Application No. EP 19382063.6, filed on Jan. 31, 2019, the entirety of each of which is incorporated herein by reference.

TECHNICAL FIELD

The field of the present disclosure is automatic learning and processing mechanisms, including. a fractal cognitive computing node (FCN), a computer-implemented method for learning procedures, a computational cognition cluster (CLU), and a computational cognition architecture (CCA).

DESCRIPTION OF THE RELATED ART

Some patents and/or patent applications are known in the field.

For example, US 20150294217A1, issued as U.S. Ser. No. 10/635,967, discloses methods, systems and computer program products to memorize multiple inputs into an artificial neuron that includes multiple dendrites each having multiple dendrite compartments. Operations include computing coincidence detection as distal synapse activation that flows from more proximal ones of the dendrite compartments to a soma of the artificial neuron, generating a dendritic action potential responsive to the coincidence detection from a non-zero activation value input received at a corresponding one of the dendrite compartments that includes a non-zero receptivity, and responsive to generating the dendritic action potential, decrementing the activation value and the receptivity and passing the decremented activation value to a next one of the dendrite compartments.

U.S. Pat. No. 9,239,989B2 discloses a computer-implemented system including an edge module and at least one input device coupled to the edge module. The at least one input device is configured to generate data input signals. The system also includes a cognitive module coupled to the edge module. The cognitive module includes a perception sub-module coupled to the edge module. The perception sub-module is configured to receive the data input signals. The cognitive module also includes a learning sub-module coupled to the perception sub-module. The learning sub-module is configured to adaptively learn at least in part utilizing the data input signals.

U.S. Pat. No. 7,567,889B1 relates to a data processing method, which runs on a data processing device, for mapping input data to be processed onto output data. According to this method: the data objects to be processed are input as input data; the input data objects are processed with aid of a topology-preserving map by the arrangement of neurons according to a predetermined schema in an arrangement space; code book objects in the result space are assigned to the neurons, and; code book objects are processed in accordance with the calculation rule of a topology-preserving map while using data objects of the investigation space. The processed code book objects are output as output data. Embodiments of the disclosure are characterized in that at least a portion of the input data objects is used in order to determine the arrangement of neurons in the arrangement space and/or in that data objects are input, which are required for data processing, are independent of the input data to be processed, and which are used as data objects of the information space.

U.S. Pat. No. 9,336,774B1 discloses methods, systems, and apparatus for pattern recognition. A pattern recognizing engine includes multiple pattern recognizer processors that form a hierarchy of pattern recognizer processors. The pattern recognizer processors include a child pattern recognizer processor at a lower level in the hierarch and a parent pattern recognizer processor at a higher level of the hierarchy, where the child pattern recognizer processor is configured to provide a first complex recognition output signal to a pattern recognizer processor at a higher level than the child pattern recognizer processor, and the parent pattern recognizer processor is configured to receive as an input a second complex recognition output signal from a pattern recognizer processor at a lower level than the parent pattern recognizer processor.

U.S. Pat. No. 9,524,461B1 provides a cognitive architecture that uses hierarchically arranged modules to associate the computation of many expected attributes with a single concept. A first value stored in a first module represents a concept state. A second value stored in the first module represents an expectation state. The first module receives a third value that represents an input state. The first module has a lower hierarchy than a second module and a higher hierarchy than a third module. The first module provides the first value to the second module and the second value to the third module. The first value is computed using the third value and concept information stored in the first module. The second value is computed using the first value, the third value and expectation information stored in the first module. An actuated mechanism receives a signal derived from the second value, which influences an operation of the actuated mechanism.

US 20180341860A1, issued as U.S. Ser. No. 10/719,764, discloses a system that includes an encoder neural network configured to receive an input sequence and generate encoded representations of the network inputs. The encoder neural network comprises a sequence of one or more encoder subnetworks, each encoder subnetwork configured to receive a respective encoder subnetwork input for each of the input positions and to generate a respective subnetwork output for each of the input positions, and each encoder subnetwork comprising: an encoder self-attention sub-layer that is configured to receive the subnetwork input for each of the input positions and, for each particular input position in the input order: apply an attention mechanism over the encoder subnetwork inputs using one or more queries derived from the encoder subnetwork input at the particular input position.

Finally, scientific article "Detecting performance anomalies in scientific workflows using hierarchical temporal memory" discloses the use of Hierarchical Temporal Memory (HTM) to detect performance anomalies in the execution of scientific workflows in distributed computing environments such as clouds. The method is an online approach that can be deployed on different infrastructures without the need of previously collecting data for training purposes. HTM enables the framework to learn incrementally and detect anomalies in an unsupervised manner while adjusting to changes in the statistics of the data. The data analyzed corresponded to resource consumption metrics of executing workflow tasks and was processed in an online manner, as it became available.

However, none of the known state of the art proposals allows solving the cited problems based on the goals stated above.

SUMMARY

Embodiments of the present disclosure provide, according to one aspect, a fractal cognitive computing node (FCN) for learning procedures. The proposed FCN includes: a first input, to receive a first input signal, said first input signal comprising a first set of pairs <key, value>, the key of the first set of pairs representing an identifier pairs and the value of the first set of pairs representing a magnitude of the first input signal; a first output, to provide a first output signal, said first output signal comprising a second set of pairs <key, value>, the key of the second set of pairs representing an identifier and the value of the second set of pairs representing a magnitude of the output signal; a second input, to receive a second input signal, said second input signal being a first output signal of another FCN and comprising a third set of pairs <key, value>, the key of the third set of pairs representing an identifier and the value of the third set of pairs representing a magnitude of the second input signal; and a third input, to receive a spatial attention (SA) parameter comprising a single dimension value.

According to embodiments of the disclosure, the FCN also includes a memory and at least one processing unit. The memory stores a collection of items, each item having a set of tuples <key, value>, and each item representing a previously stored input from at least one of said first or second input signals. The processing unit is adapted to implement a computational function that compares the first input signal, the second input signal or a combination thereof to some or all of the stored collection of items and calculates a similarity measure for each compared item.

The first output signal is particularly calculated as a selection of the compared items having a similarity measure greater than the cited SA parameter. In case the selection of compared items is empty, a new item is added to the memory and the set of tuples <key, value> of the new item and the first output signal are set according to the first input signal, according to the second input signal or according to the combination of the first and second input signals. On the contrary, if the selection of compared items is not empty, the first output signal is set to said selection. In addition, the first output signal can be also set taking into consideration any tuple matching specific criteria, e.g. by considering the "value" fields of the tuples.

In an embodiment, particularly, the FCN further has a second output to provide a confidence (CF) parameter. The CF parameter is computed, by the processing unit, as a statistical grouping function over the similarity measures of the cited selection.

In an embodiment, the FCN further has a fourth input to receive a temporal attention (TA) parameter comprising a single dimension value. The processing unit can modify the values of a given tuple stored in the memory by decreasing the value by said TA parameter.

Likewise, the FCN may further have a fifth input to receive a conditioning (CD) parameter comprising a single dimension value. In this case, each item stored in the memory comprises a set of tuples <key, value, depth>, and the processing unit can modify the depth value of tuples for the selection of compared items by a magnitude defined as an addition or subtraction of a value of said CD parameter.

In addition, the FCN may further have a sixth input to receive a focus parameter (AF) relating to a filtering criterion. The processing unit can modify the value of the first output signal based on the filtering criterion of the AF parameter.

Moreover, the FCN may further have a third output to provide a coherence (CH) parameter. In particular, the CH parameter is computed as a similarity measure between the second input signal and the first output signal by the processing unit.

According to an embodiment of the disclosure, the first and second input signals and the first output signal can be received/provided in sparse-distributed representation, among any other form of compositional signal.

In an embodiment, the first input signal is received from another FCN connected thereto. Alternatively, the first input signal is received from a (remote) sensor/actuator.

In a particular embodiment, the FCN is connected to one or more different FCNs forming a hierarchical structure.

Embodiments of the present disclosure also provide, according to a second aspect, a computer-implemented method for learning procedures, the method comprises: receiving, by a first input of a computing node, a first input signal comprising a first set of pairs <key, value>, the key of the first set of pairs representing an identifier and the value of the first set of pairs representing a magnitude of the first input signal; receiving, by a second input of said computing node, a second input signal comprising a second set of pairs <key, value>, the key of the second set of pairs representing an identifier and the value of the second set of pairs representing a magnitude of the second input signal, the second input signal being an output signal of another computing node; and receiving, by a third input of the computing node, a SA parameter comprising a single dimension value.

An embodiment of the proposed method also comprises implementing, by a processing unit of the computing node, a computational function that compares the first input signal or the second input signal or a combination of said first and second input signals to some or all of a collection of items stored in a memory of the computing node, each item having a set of tuples <key, value>, and each item representing a previously stored input from at least one of said first or second input signals, and that calculates a similarity measure for each compared item.

In an embodiment, the first output signal is outputted via a first output of the computing node. The first output signal comprises a third set of pairs <key, value>, and is calculated as a selection of the compared items having a similarity measure greater than said SA parameter.

In an embodiment, the proposed method also comprises computing, by the processing unit, a CF parameter as a statistical grouping function over the similarity measures of said selection. The computed CF parameter is outputted via a second output of the computing node.

In an embodiment, the proposed method also comprises receiving, by a fourth input of the computing node, a TA parameter comprising a single dimension value, and modifying, by the processing unit, the value of a given tuple stored in the memory by decreasing the value by said TA parameter.

In an embodiment, the proposed method also comprises receiving, by a fifth input of the computing node, a CD parameter comprising a single dimension value, each item stored in the memory has a set of tuples <key, value, depth>, and modifying, by the processing unit, the depth value of tuples for the selection of compared items by a magnitude defined as an addition or subtraction of a value of said CD parameter.

In an embodiment, the proposed method also comprises receiving, by a sixth input of the computing node, a focus parameter (AF) relating to a filtering criterion. Then, the processing unit modifies the value of the first output signal based on the filtering criterion of the AF parameter.

In another embodiment, the proposed method also comprises computing, by the processing unit, a CH parameter as a similarity measure between the second input signal and the first output signal, and providing the computed CH parameter via a third output of the computing node.

In an embodiment, the proposed method also comprises replication of the FCN (e.g. parent FCN) into a new FCN (e.g. child FCN) in hierarchical configuration based on each specific item in the memory, assigning to the new FCN specific SA and TA parameters and an attachment to its corresponding tuple.

Embodiments of the present disclosure also provide, according to a third aspect, a Computational Cognition Cluster (CLU). In an embodiment, the CLU comprises a hierarchical structure formed by at least two FCNs connected to each other (e.g. a parent FCN node and a child FCN node), and the same parameters as the FCN as explained above except the SA, TA and AF parameters.

Embodiments of the present disclosure also provide, according to a fourth aspect, a Computational Cognition Architecture (CCA). In an embodiment, the CCA comprises a hierarchical structure formed by at least two CLUs connected to each other, and an input signal, and output signal and a CD parameter.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF EMBODIMENTS

Figure 1:
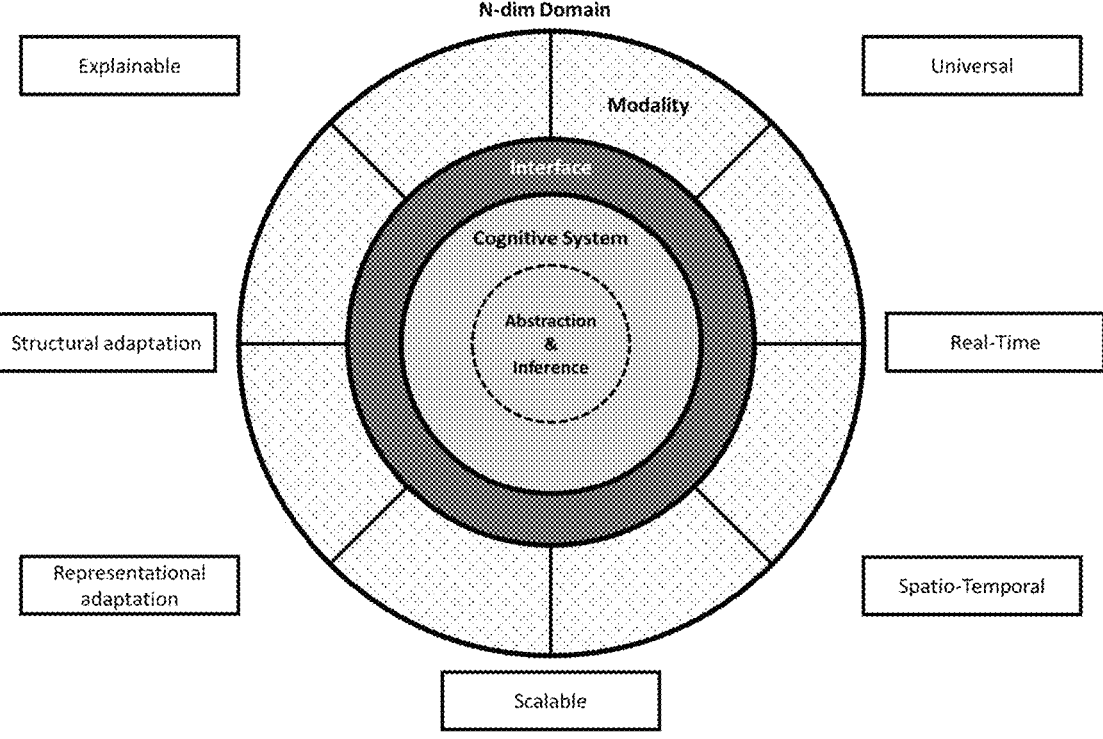
FIG. 1 is a conceptual model showing the computational formulation of the cognitive problem.

Embodiments of the present disclosure are directed, in general, to automatic learning and processing mechanisms. In particular, embodiments of the disclosure relate to a fractal cognitive computing node (FCN), to a computer-implemented method for learning procedures, to a computational cognition cluster (CLU) and to a computational cognition architecture (CCA).

From a biology perspective, embodiments of the present disclosure are framed in the computational understanding of the underlying general cognitive mechanism of neuron-based life beings. From a computational perspective, embodiments of the disclosure are directed to automatic learning and processing mechanisms, specifically, to recurrent and parallel computing methods under the connectionist paradigm and, strictly, under no neuron, no dendrites or any biology physical simulation-based approach.

According to embodiments of the present disclosure, an FCN should be understood as a node that performs computational operations according to cognitive and fractal premises.

A target problem to solve is the definition of a computational model of cognition which, through exposure of external input data, produces output relational responses at sensory-motor episodic and high attentional levels, and capable to model and reproduce component-oriented reactive and reasoning behaviors.

The problem can be divided into the following sub-problems:

Cognition biological inspiration:

The cognition definition is used in the context of cognitive science approach and it refers to any kind of mental operation or structure that can be studied in precise terms. In a more generalist way, cognition can be defined as follows: The mental action or process of acquiring knowledge and understanding thought, experience, and the senses and actuators.

Goals:

Goal 1: The first goal is, from a computational perspective, to express cognition as an information processing model. From the context of biology, since so many neuron-based configurations and cognitive features exist in the world, and all of them are synthesized through a suitable physical memorization mechanism such as neurons, dendrites and other artefacts, then an underlying, but unknown, data processing model exists as well. Hence, by knowing its properties, a suitable framework for human-like, bio-like, artificial and hybrid spaces of applications can be obtained. Thus, the goal is to identify frameworks that incorporate elements of the information processing occurring in these spaces of applications.

Goal 2: The second goal is to specify such an information processing model of cognition under general procedural programming and a von Neumann-based paradigm. After specifying such a model, the goal is to transfer its features to a general procedural programming model to synthesize cognition effects in a von Neumann Machine. To achieve this milestone, factuality, connectionism, parallel computing and recurrent programming are used to get higher levels of problem reduction at primitive expression and therefore, allowing a wider space of possible computational approximations.

Goal 3: The third goal is to model such an information processing model of cognition as a fractal computational primitive and its scaling properties as a sampling method of processing. Biological cognition is more a continuous-time processing rather than an analytical processing and therefore, more suitable to be solved by a continuous-time sampling strategy over an external n-dimensional input/output domain. Adaptation to external data content is the essence of cognition as a general domain modelling method, understanding "content" as similarity-driven compositional information instance, driving to conditioned and long-term adaptation, and leading finally to dimensional and content plasticity effects.

Computation Problem Specification:

Besides the above, general cognition problem can be defined as a real-time spatio-temporal sampling strategy of synchronic events to deliver scalable abstraction and inference effects over a n-dimensional sampling domain in a universal, scalable, structurally and representationally adaptive manner and synthesized through a suitable physical memorization mechanism. FIG. 1 illustrates an example thereof, in which:

N-dimensional domain: the domain is the set of available basic dimensions potentially selected as part of synchronic events of simultaneous activation. The basic dimensions are defined as input and/or output channels from/to the external domain data source and the Cognitive System through the interface.

Modality: a modality is a subset of the n-dimensional domain that exhibits synchronic event activity independent of any other dimension in the domain. It may refer to specific high-level input/output information channels.

Interface: is the logical division of dimensions in the form of a set of ranges. The set of ranges can be specified as a single-domain or as a hierarchical structure of sub-domains with their corresponding sub-ranges.

Cognitive system: is a computational mechanism that captures synchronic events in the domain and projects inferred activation of any dimension based on a synchronic event register. This activity is performed continuously in sequence and time updating the captured sample and projecting spatio-temporal inference over the domain dimensions.

Abstraction & Inference: The Cognitive System performs the cognitive function defined as a dual, essentially opposed and complementary functions: abstraction and inference. Abstraction function exhibits the capability to extract the relevant essence of synchronic events and producing a register as a private memory component which representational items are the best similar invariant representatives of the domain activity. Inference function exhibits the capability to infer, from a given current input activity, the set of recalled other dimensions, projecting best expanded recall with a basic generalization effect.

Additionally, the Cognitive System is configured to perform the cognitive function over domain in one or more, or in many cases all, of the following manners:

Universal: The Cognitive System is capable of processing any kind of information entity that can be expressed as an n-dimensional representation.

Real-time: The Cognitive System is capable of operating in continuous-time mode, understanding that each sample captured is related to previous and next ones as a consequence of an external domain sequence of events. As a complementary assumption, the Cognitive System can be able to produce an inference throughput frequency high enough to meet the external domain functional requirements.

Spatio-temporal: The Cognitive System is capable of producing abstraction and inference functions over n-dimensional representations in their space of synchronicity. Additionally, the Cognitive System is capable of producing abstraction and inference functions over n-dimensional representations in their sequence relationship.

Scalable: The Cognitive System can be scaled to fit any modality configuration and cognitive capability.

Representational adaptive: The Cognitive System is capable of adapting its memorized content to short/mid/long-term adaptation, as the capability to selectively and progressively accelerate cognition effects through time of specific activities of the domain.

Structural adaptive: The Cognitive System is capable of adapting its internal mechanisms to tolerate any change in the interface definition of modalities and dimension ranges to support no prior knowledge about domain interpretation.

Explainable. The Cognitive System is capable of providing explainability at spatial, conditioning, sequencing, episodic, attentional and symbolic levels.

Embodiments of the present disclosure provide a fractal cognitive computing node (FCN) 100 that provides a computational approach for general cognition, a computer-implemented method for learning procedures, a computational cognition cluster (CLU) 200 and a computational cognition architecture (CCA) 300.

Figure 2:
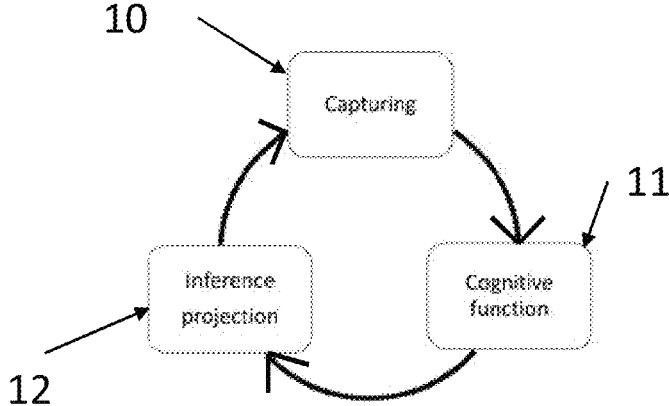
FIG. 2 is a flow chart depicting the relationship between the various steps in the cognitive process.

FIG. 2 shows a cognition method illustrating a sampling approach for cognition with steps of capturing 10, cognitive function 11, and inference projection 12. Generally, as can be seen in FIG. 2, the cognition requirements definition is based on a sampling approach, consequent with the fact that domain is connected to the Cognitive System in real-time.

Capturing 10 involves capturing new data. In some embodiments, capturing 10 involves capturing a new sample of a synchronic event. Cognitive function 11 involves the action of applying abstraction and inference functions. Inference projection 12 involves the action of projection of the inferred dimensions activity.

Figure 3:
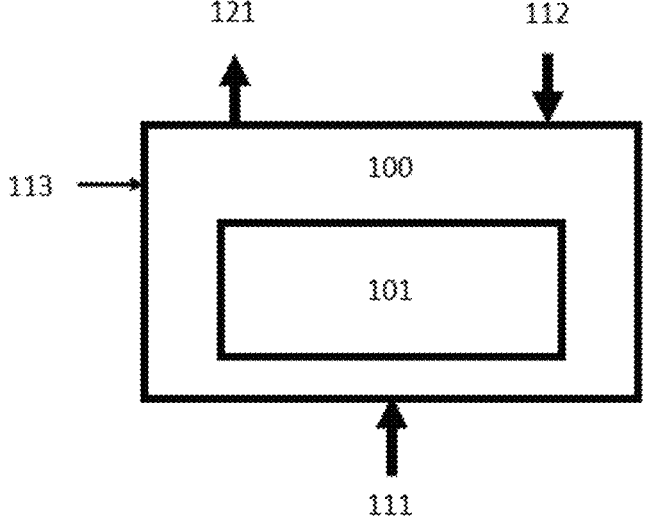
FIG. 3 is a conceptual illustration of a fractal cognitive computing node (FCN), according to one embodiment of the present disclosure.

FIG. 3 shows a conceptual illustration of a fractal cognitive computing node (FCN) 100, according to one embodiment of the present disclosure. The FCN 100 includes a first input 111, a second input 112, a third input 113, a first output 121, a memory 101 and at least one processing unit with one or more processors (not shown for simplicity of the figure).

The first input 111 is configured to receive a first input signal comprising a first set of pairs <key, value>, the key of the first set of pairs representing an identifier and the value of the first set of pairs representing a magnitude of the first input signal. The first output 121 is configured to provide a first output signal comprising a third set of pairs <key, value>, the key of the third set of pairs representing an identifier and the value of the third set of pairs representing a magnitude of the output signal. The second input 112 is configured to receive a second input signal being a first output signal of another FCN 100 and comprising a second set of pairs <key, value>, the key representing an identifier of the second set of pairs and the value of the second set of pairs representing a magnitude of the second input signal. For example, the first and second input signals and the first output signal are received/provided in sparse-distributed representation (SDR). The first input signal can be received from another FCN 100 (e.g. from a children FCN) in case it is an internal FCN structure or the first input signal can be generated by an encoder sensor if the FCN is a leaf of a structure.

The third input 113 is configured to receive a spatial attention (SA) parameter comprising a single dimension value. In particular, the SA parameter defines the threshold which is applied in order to drive learning from new signals and the recalling of learned ones. SA parameter impacts on the level of detail at which the cognitive step takes place.

The cited memory 101 of the FCN 100 is configured to store a collection of items, where each item has a set of tuples <key, value>, and represents a previously stored input from at least one of said first or second input signals. The processing unit implements the computational function for performing the learning/recalling procedures against all previously learned patterns. To that end, the processing unit compares the first input signal, the second input signal or a combination of said first and second input signals to some (or all) of the stored collection of items (in general of a plurality of interconnected FCNs 100) and calculates a similarity measure for each compared item. The processing unit generates the first output signal as the selection of the compared items having a similarity measure greater than the SA parameter.

The use of the SA parameter is to set the precision that will be applied to the similarity measure. SA parameter may be defined as a fixed value for each FCN 100. If SA has a very low value (for instance 0.10), the items created in the memory 101 will be selected based on this precision and, therefore, very few items will be created in the memory 101, providing a very high simplification of the representational space relative to the actual domain exposure. Consequently, the inference effect or the recall of specific item in the memory 101 will be very relevant since the related inferred tuples of the item recalled based on an input sample are relevantly different. On the other hand, if SA parameter has very high values, a lot of items will be created in the memory 101, but consequently, very poor inference will be produced since for a specific recalled item only happens when samples are very similar to the item and therefore, very few tuples will be inferred.

Figure 4:
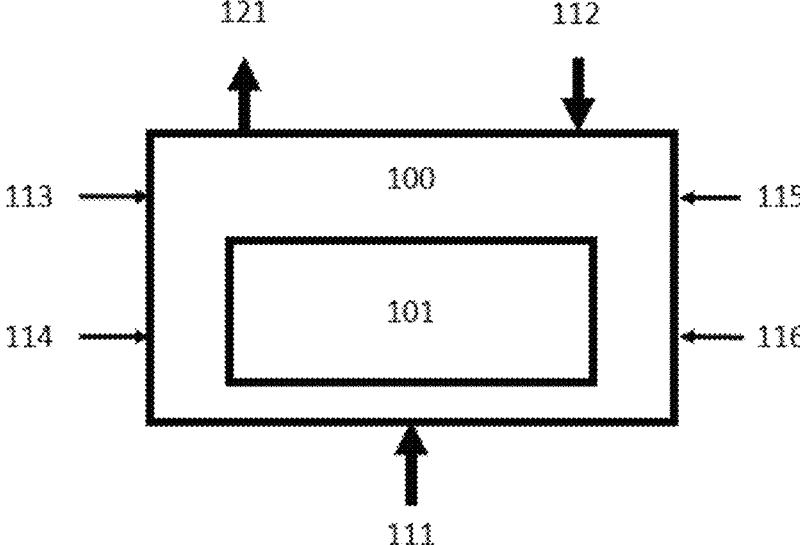
FIGS. 4 and 5 are conceptual illustrations of a fractal cognitive computing node (FCN), according to other embodiments of the present disclosure.

FIG. 4 shows a conceptual illustration of a FCN 100 according to another embodiment of the present disclosure. Besides the features previously described, in this case the FCN 100 also includes a fourth input 114 to receive a temporal attention (TA) parameter, a fifth input 115 to receive a conditioning (CD) parameter and a sixth input 116 to receive a focus (AF) parameter.

Figure 5:
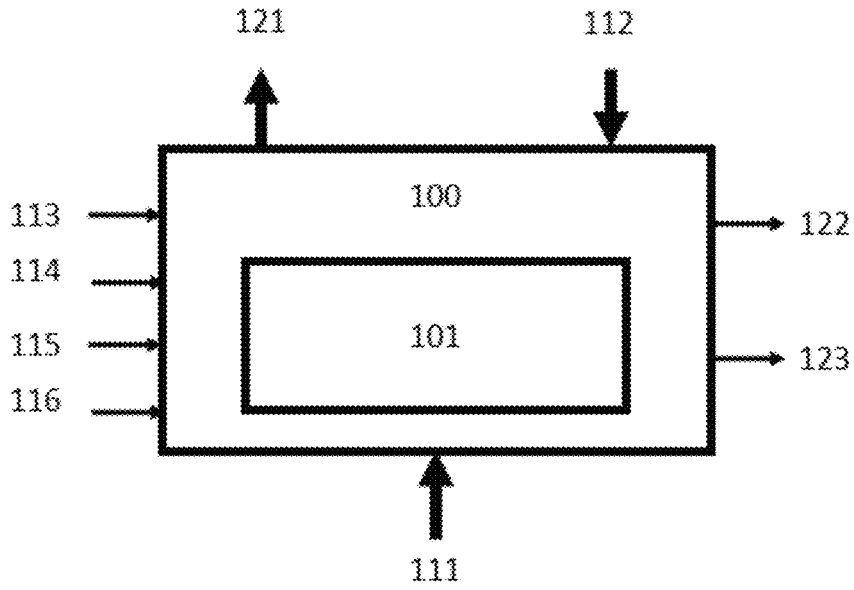

FIG. 5 shows another conceptual illustration of a FCN 100 according to another embodiment of the present disclosure. In this case, the FCN 100 also includes a second output 122 to provide a confidence (CF) parameter and a third output 123 to provide a coherence (CH) parameter. It should be noted that in other embodiments, in this case not illustrated it is not necessary to have all these additional inputs and outputs but only one of them.

The TA parameter, which comprises a single dimension value, defines the time range that the cited computational function is applied on. Wider ranges allow the FCN 100 to change the sequence length of pattern processing. When receiving this TA parameter, the processing unit can modify the value of any tuple stored in the memory 101 by decreasing that value by TA parameter.

TA parameter is used to specify a fixed sequencing context that will be considered in the similarity operation. If TA has a value of 1, any "value" of any tuple greater than zero, will be zero in one processing step, producing strict spatial cognition. If TA has a higher value such as 10, the "value" of greater than zero tuples will be zero progressively after 10 processing steps. The overall effect consists in a sequencing or transitional cognition effect, converting a temporal relationship into spatial relationship, since transitional items of the memory 101 will represent a spatial transition.

The CD parameter, which also comprises a single dimension value, either positive or negative, defines, when positive, a reinforcement level and, when negative, it defines an inhibition level. In this case, each item stored in the memory 101 comprises a set of tuples <key, value, depth>. The processing unit can modify the depth value of tuples for the selection of compared items by a magnitude defined as an addition or subtraction of the value of said CD parameter.

The CD parameter is considered as an accelerator or inhibitor of the depth field of the tuples of each item in the memory 101. In a specific sample processing step, if CD is greater than zero, the delta increment of the depth value of the selected items in the similarity operation result will be proportional to CD parameter value. This allows applying a progressive sub-selection process of specific sub-domain, producing a valuable mechanism to short-term adaptation as cognition guidance criteria. This mechanism is especially valuable when not all the exposed samples of the domain are correlated or otherwise directly related to achieving a target task or behavior. For example, if a certain targeted output is, through a known or determined mechanism or physical phenomenon, based on some, but not all of the exposed samples in a domain, the CD can be set to a value greater than zero for the exposed samples that impact the targeted output to guide cognition. On the other hand, if CD is smaller than zero, the effect on the depth values of the selected items by the similarity operation will be temporally inhibited and therefore, they will be excluded from the current outputted signal, providing the best next alternative item selection.

The focus parameter (AF) refers to a filtering criterion. The processing unit can modify the value of first output signal taking into consideration this filtering criterion.

The AF parameter is used as a filter operating between the memory items selection from the similarity operation and the final outputted signal. This allows applying specific criteria of sub-selection of current selection, allowing a mechanism of focusable cognition. Depending on the specific AF value set, the projection of inferred signals to the dimensions of the domain will be more reactive, understood as the best similar selection of items in the memory 101 or more focusable or attentional, producing projections more specific on the potential total possible selection.

The CF parameter is computed as a statistical grouping function over the similarity measures of the cited selection of compared items. That is, this output parameter shows the value of confidence of recalled pattern delivered in the first output 121.

The CF parameter is a measure of the recalling percentage of the similarity function produced in a specific sample processing. If only one item in the memory 101 is recalled, CF parameter will be equal to the similarity value result of comparing the sample signal to the item tuple composition. If more than one item is selected from the memory 101, CF parameter value is set to a grouping arithmetic function over the individual similarity measures (CFs), for instance, the average of the individual CFs. Consequently, CF parameter can be understood as a measure of local recall degree.

The CH parameters shows a measure of difference between the second input signal and the first output signal, understood as a measure of success of cognitive function. Additionally to CF measure, an FCN 100 can provide another measure related to the quality of cognition, not locally as CF, but structurally contextually to the rest of the FCN hierarchy it belongs. CH parameter is calculated as the similarity comparison of signals in output 121 and input 112.

This calculation measures the coherence between the evidences of sampling from the environment and the expected inference or spatial transition at each FCN 100. Therefore, CH parameter measures the cognitive coherence at each FCN 100, providing valuable information on changes of cognitive status.

According to embodiments, the first output signal outputted via the first output 121 can be reduced in size by a percentage set by a redux parameter. This reduction has to be compliant with the semantic perspective, showing the same internal relationships as the original signal filtered by relevance.

Figure 6:
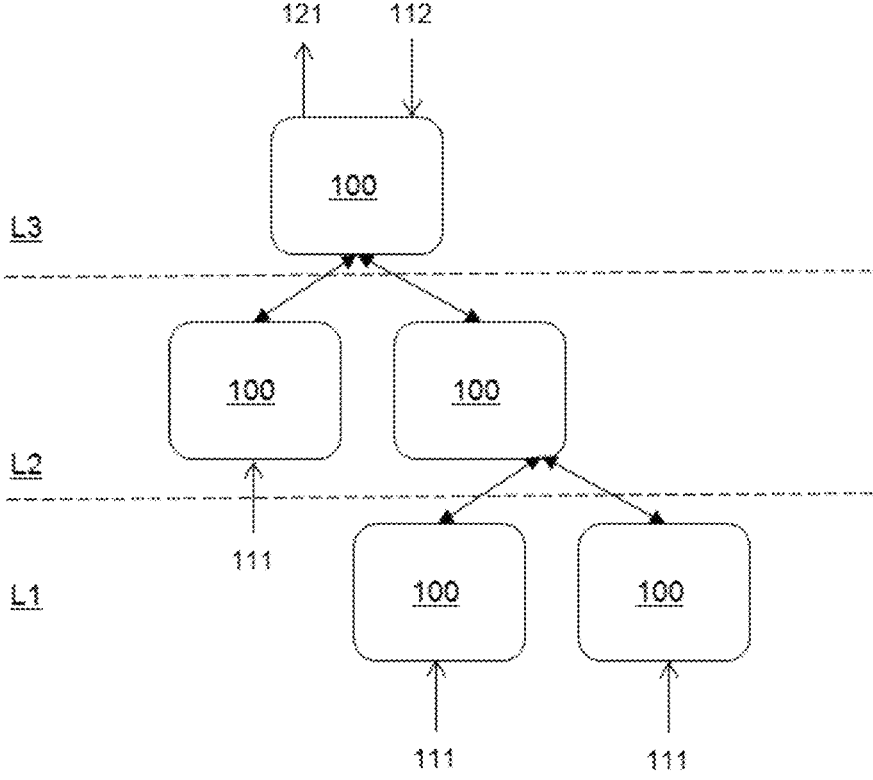
FIG. 6 is a conceptual drawing showing different fractal cognitive computing nodes connected at different levels forming a hierarchical structure, according to an embodiment of the present disclosure.

FIG. 6 is a conceptual drawing of different FCNs 100 interconnected at different levels forming a hierarchical structure, according to an embodiment. In this hierarchical structure the different FCNs 100 learn from each other. FIG. 3 illustrates an example with three different levels L1-L3 of connection. Each of FCNs 100 will implement the computational function for performing the learning/recalling procedures based on their corresponding signals. This make FCNs 100 to learn/recall the most similar previously learned patterns and produce a first output signal containing the pattern recalled/learned. The FCN 100 at the third layer L3 receives in the first input 111 the combination of the two FCNs 100 of the second layer L2. Taking this combination as a single first input signal, the FCN 100 at the third layer L3 will perform the computational function, learning/recalling based on this combined signal.

As a result, this structure creates a first level of knowledge individually for each FCN 100 but at the same time, creates a second level of knowledge as an overall context, with the capability of inferring one to each other. In this structure, a partial stimulation of lowest level will produce that top FCN 100 will produce a first output signal 121 containing the most similar combined pattern, which will be sent to the lower FCNs 100 (children FCNs) via the second input 112. The FCN 100 which is not stimulated will choose the second input signal as input signal and, therefore, will activate original individual pattern.

This advantageously achieves individual cognition for each FCN 100 at lowest level; associative cognition between them at top level; bottom-up and top-down flow of information in the same structure; and continuous learning operational behavior for new data as well as new predicted values.

It should be noted that as a derived structure of the principle shown in the basic structure of FIG. 3, custom hierarchical structures can be also defined including 2-dimensional structures (i.e. defined based on a 2D space) or any n-dimensional or natural structure (i.e. no space arrangement is known, so all possible relationships between dimensions are captured).

Figure 7:
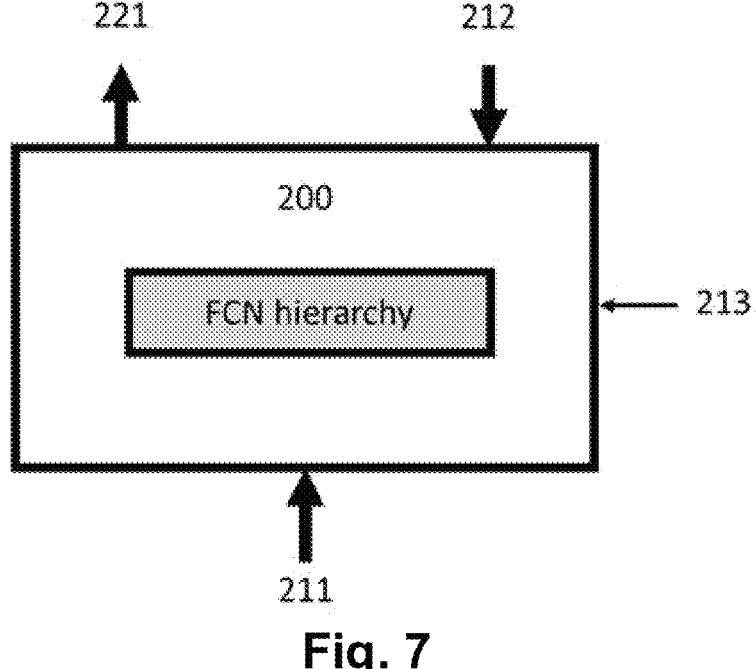
FIG. 7 is a conceptual illustration of a computational cognition cluster, according to an embodiment of the present disclosure.

With reference to FIG. 7, therein it is illustrated an embodiment of a computational cognition cluster (CLU) 200. As a consequence of a replication operation of the FCNs 100, a hierarchy is created in such a configuration where the seed FCN SA parameter is set to low values, providing low precision cognition. As the different items in the memory 101 have a specific new FCN 100 for their composition of tuples with higher SA value and lower TA values, the overall cognition is performed in more spatial and sequence context precision, producing an escalation of the cognition effect. This allows to, from the CLU 200 perspective, to perform invariance archetyping and inference without any precision parameter. Each CLU 200 is also defined as a connectable component in hierarchical structures, comprising a first input 211 to receive an input compositional signal of tuples from the output 221 of its children CLUs, an output 221 connected to the input 211 of the parent CLU 200, and a second input 212 to receive a second signal from the output 221 of the parent CLU 200. Additionally, a CD parameter may be defined equally to the FCN 100, which value is inputted via input 213 from the external domain and internally connected to all the FCNs 100 in the CLU internal hierarchy via input 116.

Hence, the CLU 200 may be defined as a memorization component that in an unsupervised manner creates a distributed knowledge representation with the essence of the domain and produces maximum inference complementation and increasingly to maximum levels of precision with no internal parameters.

Figure 8:
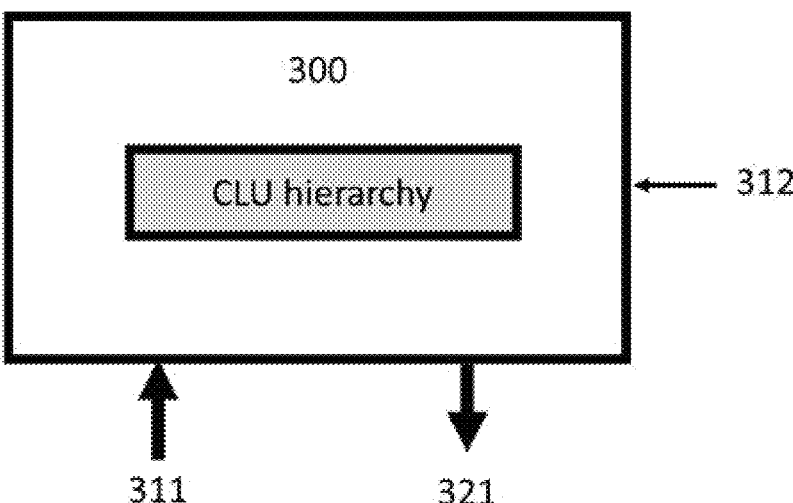
FIG. 8 is a conceptual illustration of a computational cognition architecture, according to an embodiment of the present disclosure.

With reference to FIG. 8, therein it is illustrated an embodiment of a computational cognition architecture (CCA) 300. The CCA 300 comprises a hierarchical structure of CLUs 200 that may be connected as described above. The CCA 300 also comprises several parameters such as an input compositional signal of tuples received via a first input 311, and output 321 to project to the domain dimensions and a domain CD parameter defined as the same as the other substructures which is received via input 312. The CCA 300 performs the same cognitive effects of archetyping and inference but in a more efficient way due to given sub-domain specification which reduces sub-domain complexities and takes the benefit of recurrency of cognition. The structures of CLU map the sub-domain structures of the domain, typically interpreted as domain structure of the discrete data or domain structure of a virtual or physical configuration of an embodied agent in terms of modalities or sensing/actuation dimension ranges.

Hence, the CLU hierarchical structure allows defining a suitable cognition architecture to deploy a cognition-based control system of components or agents, through the domain sampling and conditioning stimulation, producing universal, real-time, spatio-temporal, scalable, adaptive and explainable unsupervised machine learning effects.

Figure 9:
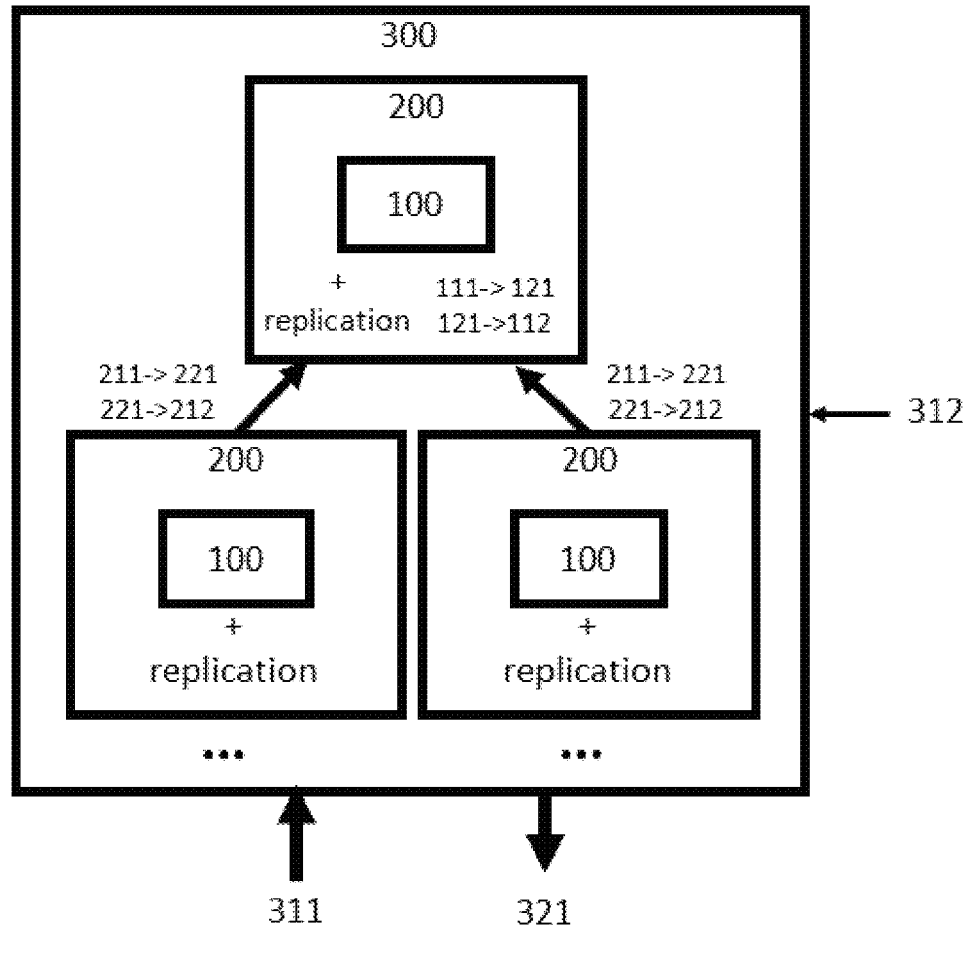
FIG. 9 illustrates another embodiment of a computational cognition architecture including different computational cognition clusters, according to an embodiment of the present disclosure.

With reference to FIG. 9, therein it is illustrated another embodiment of a CCA 300. In this case, the CCA 300 includes a first input 311 to receive a first input signal from the interface and an output 321 to provide a first output signal to the interface between the domain and the architecture. In this embodiment, the CCA 300 is formed by a configured hierarchical structure of CLUs 200 connecting the first output signal of each child (provided via the first output 221) to the first input 211 of the parent and connecting the first output 221 of the parent to the second input 212 of the children. Each CLU 200 may initially contain one FCN 100, which will be replicated based on the items of the memory 101 that will be created and by connecting the first output signal of each child (provided via the first output 121) to the first input 111 of parent and by connecting the first output 121 from parent to the second input 112 of each child. The specific architecture is defined based on known domain and sub-domains structures and it is specified through the interface.

Figure 10:
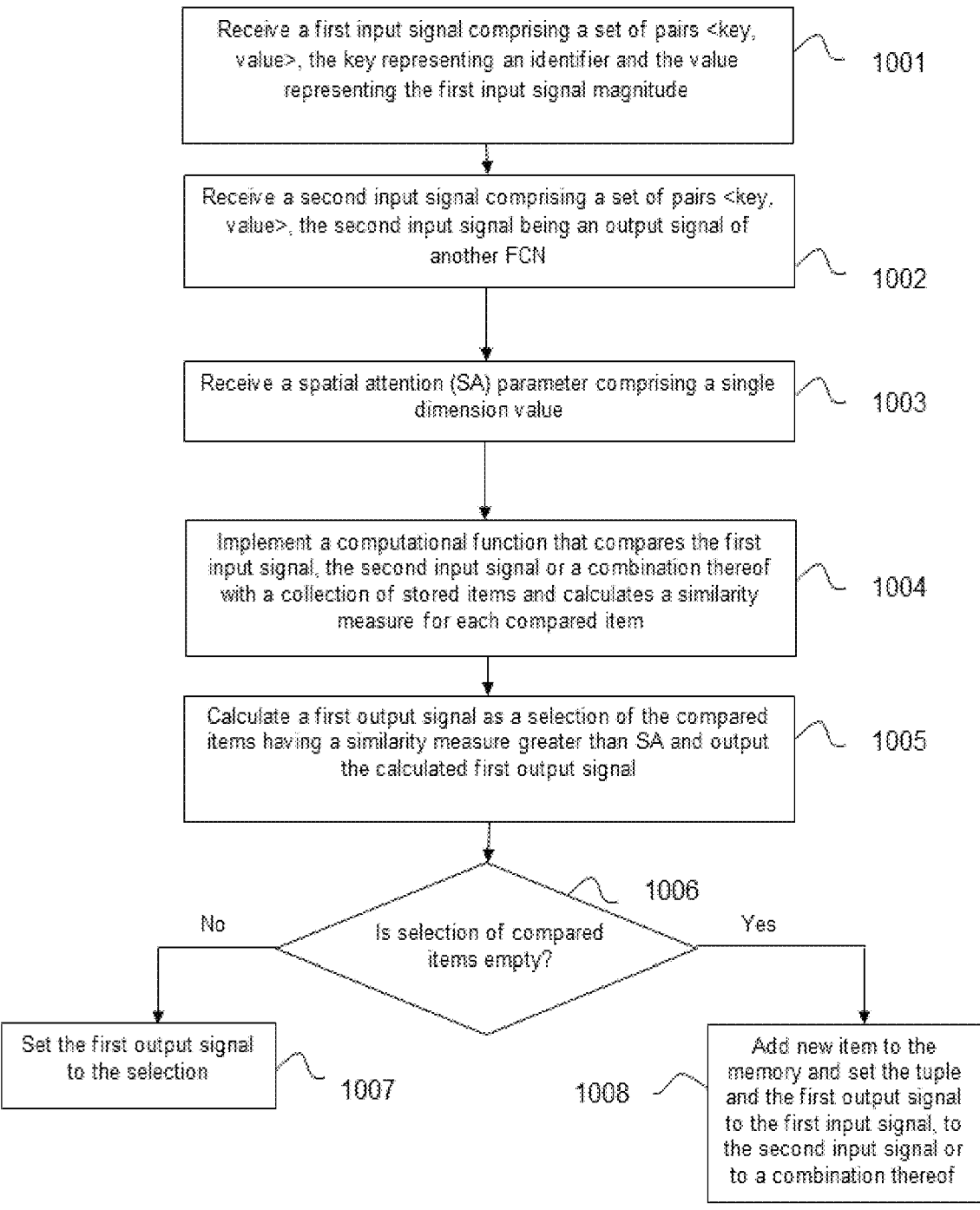
FIG. 10 is a flowchart illustrating a method for learning procedures in a computing node such as a FCN, according to an embodiment of the present disclosure.

FIG. 10 is a flowchart illustrating a method for learning procedures, according to an embodiment of the present disclosure. At step 1001, a first input of a computing node such as a FCN 100 receives a first input signal comprising a first set of pairs <key, value>, the key of the first set of pairs representing an identifier and the value of the first set of pairs representing the first input signal magnitude. At step 1002, a second input of the computing node 100, receives a second input signal comprising a second set of pairs <key, value>, the second input signal being an output signal of another FCN 100. At step 1003, a third input of the computing node 100 receives a SA parameter. At step 1004 the computing node 100 implements a computational function for learning/recall procedures by comparing the first input signal, the second input signal or a combination of the first and second input signals with a collection of stored items and by calculating a similarity measure for each compared item. Each item represents a previously stored input from at least one of said first or second input signals, and each item at least has a set of tuples <key, value>.

At step 1005, a first output signal is calculated as a selection of the compared items having a similarity measure greater than a SA parameter. At step 1006, it is checked whether the selection of compared items is empty or not. If the selection of compared items is empty, a new item is added (step 1008) to the memory 101 and the set of tuples and the first output signal are set to the first input signal, to the second input signal or to a combination of the first and second input signals. On the contrary, if the selection of compared items is not empty, the first output signal is set (step 1007) to the selection.

Figure 11:
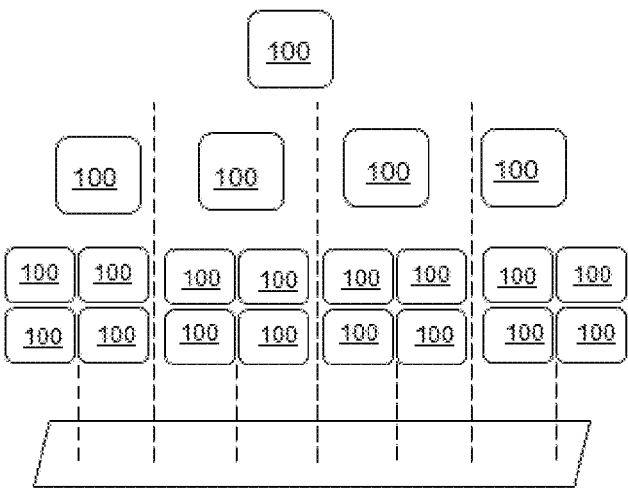
FIG. 11 is a conceptual drawing showing an alternative custom hierarchical structure according to an embodiment, in this particular case a 2-dimension structure schema.

FIG. 11 shows a two-dimensional system made up of FCNs 100. This is an embodiment of the custom hierarchical structures for a given space that is discussed above in FIG. 6.

Referring back to FIG. 2, the sampling continuous cycle is general and independent of domain interpretation of synchronic events. Therefore, it can be interpreted in multiple paradigms. Particularly, in neuro-based biological systems or in data science practice the following use cases can be considered:

Discrete paradigm. Used in digital data storage and analysis in the algorithmic computing approach. The cognition cycle is applied to multi-dimensional transduction of data to be able to be processed in cognitive computing approach. This paradigm is based on symbolic representations of the domain.

Domain definition:

A discrete domain is a set of information entities which can be inputted to and outputted from the system.

Any entity is considered a homogeneous information source and typically corresponds to attributes or features of the interpreted domain such as product features, client's features, etc.

Each entity is configured as a CLU and the known hierarchical relationship between entities defines the hierarchical structure of CLUs. For instance, a top CLU (catalogue) is divided into 2 families (2 CLUs) which at the same time have 3 products (3 CLUs per family) and where each product has 10 attributes (10 CLUs product).

So, the goal is to model the values and the association between different sub-domains in order to be able to infer some of them based on specific stimulation of the others.

Transduction:

Each entity of information of the domain corresponds to a specific domain of values; the values of the sampling event are encoded and decoded at every step of sampling. The strategy to map discrete values into compositional representations (signals) depends on the specific interpretation of the attribute and can be based on non-overlapping values (labels, categories, etc.), or on overlapping values (numeric values or any continuous variable).

Each entity will encode/decode based on a specific range of source dimensions of the n-dimensional domain and specific or variable size of the composition of the signal.

In the case of discrete information, the encoding/decoding criterion equals to apply an interpretation of the domain values to the compositional signals in order to be properly processed by embodiments of the present disclosure.

Sampling flow:

This case typically provides a data set with several attributes (columns) referring to different discrete value of domains/sub-domains hierarchy.

At each sampling step, one epoch of the dataset is processed under the assumption that no previous activation of values of tuples in the memories of any FCN exists, and therefore, samples are considered as isolated in terms of sequencing.

Each step encodes the epoch values of entities creating the corresponding compositional input signals to the system.

The system processes the input signal 311 and after a variable number of system execution cycles (depending on the different hierarchies at CCA and CLUs levels), the system returns an inferred output signal (321) which, projected onto the dimensional space (each signal item may refer to a specific dimension in the domain) can be decoded and interpreted by the sampling process.

Abstraction and inference effects on the domain:

This case is used to produce a cognitive task of classification (variable prediction) based on a set of features of an entity of information (such as product buy/not buy prediction of a client based on provided descriptive and quantitative features.

At each epoch processing of the data set, the system performs abstraction through all the system components and generates higher invariance of the identified memory items as higher in the hierarchical structure. This effect allows the cognitive system to produce an internal simplified representation of the exposed domain in a distributed way through all the FCNs in each CLU of the CCA.

At the same time, the system performs inference on the rest of the dimensions of the domain and not exposed in the input signaling of each sample, producing an effect of prediction on the variable compositional dimensions, based on the previous exposed values and their associated prediction value in the samples.

Through the processing of several samples, the system will under no parameters, model representations of the exposed domain in an increasing precision, being able to use this information to infer missing attributes even in not 100% matching of the provided signaling.

Typically, interpreted performance or accuracy measures can be calculated to evaluate inference quality from an interpreted semantics of the domain.

Sensory-motor paradigm. Used to solve sensory, motor and sensory-motor integration problems.

Domain definition:

In this paradigm, the domain refers to the dimensional space defined by the possible source dimensions key ranges as a compositional representation corresponding to already multi-dimensional (or compositional) representation external to the system.

Typically refers to different modalities (type of high level different sources of information of the domain) such as an image, which can be considered as a compositional representation of pixels.

Transduction:

Encoding/decoding operations needs no special compositional criteria since they are typically n-dimensional information entities.

Sampling flow:

For this paradigm, if the dataset and their contained epochs are considered not as a sequence, the flow is the same as the discrete paradigm, assuming that each sample is not related in time with the previous and next ones.

If the dataset or domain source is a sequence of samples, the flow is considered as continuous-time mode and the different samples are not processed as isolated epochs but part of a sequence in the domain. In this scenario, the event processing of the system is continuous and the changes in content of the signaling take place when the environment detects them.

Abstraction and inference effects of the domain:

In this paradigm, the creation of an internal model of the domain values is also produced, providing a cumulative invariance of the internal representations as higher in the hierarchies of FCNs and CLUs of the architecture.

At the same time, the system performs inference on the rest of the dimensions of the domain and not exposed in the input signaling of each sample, producing an effect of prediction on the other modality compositional dimensions, based on the previous exposed values and their modalities association seen in the samples.

Through the processing of several samples, the system will under no parameters, model representations of the exposed domain including the sequential relationships between them in an increasing precision, being able to use this information to infer missing modalities in a spatio-transitional way, even in not 100% matching of the provided signaling.

Typically, interpreted performance or accuracy measures can be calculated to evaluate inference quality from an interpreted semantics of the domain.

Agent paradigm. Used to solve autonomous agent-like problem through neuron-based computation.

Domain definition:

This paradigm is framed in an autonomous agent or actor that's interacts in a physical or virtual world dynamics and, through sensors and actuators, perceives and reacts converging into tasks modelling or multiple-tasks (behavior) modelling.

The domain comprises one or more input modalities or output modalities (ranges of dimensions of the domain). Input modalities are connected to sensors and output ones are connected to actuators from and to the external world.

Transduction:

Encoding and decoding strategies can be any combination of multi-dimensional (already compositional) or discrete (symbolic) entities.

In any case and as described in previous paradigms, each type of entity will be encoded as a compositional representation (signal of tuples) and decoded accordingly.

Sampling flow:

The sampling flow is typically considered continuous-time, therefore, spatio-transitional abstraction and inference will be produced by the system.

Abstraction and inference effects of the domain:

The abstraction distributed effect will produce a simplified modelling of the world exposed by the different samples.

The internal model is used to infer spatio-transitional recalls of previous experience to be projected to the external dimensional space.

Typically in this paradigm, experiments (sequence of continuous-time samples) are defined to evaluate task-related and behavior-related responses in front of specific perception signaling.

The experiences samples can be provided in a dataset format or, more typically, in a real-time approach.

The foregoing describes embodiments of the present disclosure and modifications, obvious to those skilled in the art can be made thereto, without departing from the scope of the present disclosure.

The invention claimed is:

1. A computing device for learning procedures, said computing device comprising a first fractal cognitive computing node (FCN) the FCN comprising:

a first input, configured to receive a first input signal, said first input signal comprising a first set of pairs <key, value>, a key of the first set of pairs representing an identifier and a value of the first set of pairs representing a magnitude of the first input signal;

a first output, configured to provide a first output signal, said first output signal comprising a second set of pairs <key, value>, a key of the second set of pairs representing an identifier and a value of the second set of pairs representing a magnitude of the first output signal;

a second input, configured to receive a second input signal, said second input signal being a first output signal of another FCN and comprising a third set of pairs <key, value>, the key of the third set of pairs representing an identifier and the value of the third set of pairs representing a magnitude of the second input signal;

a third input, configured to receive a spatial attention (SA) parameter comprising a single dimension value;

a memory, configured to store a collection of items, each item having a set of tuples <key, value>, and each item representing a previously stored input from at least one of said first or second input signals; and a processing unit comprising one or more processors, configured to implement a computational function that:

compares the first input signal or the second input signal or a combination of said first and second input signals to some or all of the stored collection of items; and calculates a similarity measure for each compared item;

wherein said first output signal outputted via said first output being calculated as a selection of the compared items having a similarity measure greater than said SA parameter;

wherein when the selection of compared items is empty, a new item is added to said memory and the set of tuples <key, value> of the new item and the first output signal are set according to the first input signal, to the second input signal or to a combination of the first and second input signals;

wherein when the selection of compared items is not empty, the first output signal is set to said selection;

wherein the first fractal FCN is configured to be replicated into a new FCN by replicating at least one of the items stored in the memory of the first FCN in the new FCN and by connecting a first output of the new FCN to the first input of the first FCN and a second input of the new FCN to the first output of the first FCN, wherein the new FCN is replicated from the first FCN based on at least on one of the items stored in the memory of the first FCN;

the first new output of the new FCN is coupled to the first input of the first FCN;

the second new input of the new FCN is coupled to the first output of the first FCN, wherein at least two FCNs connected to each other form a Computational Cognition Cluster having a hierarchical structure, wherein the Computational Cognition Cluster further comprises a first input, configured to receive a first input signal from an output of a children Computational Cognition Cluster, said first input signal comprising a compositional signal of tuples;

an output, configured to connect the Computational Cognition Cluster to a parent Computational Cognition Cluster via a first input of the parent Computational Cognition Cluster; and a second input, configured to receive a second input signal from an output of the parent Computational Cognition Cluster; and a third input, configured to receive a conditioning (CD) parameter comprising a single dimension value.

2. The computing device of claim 1, further comprising a fourth input, configured to receive a temporal attention (TA) parameter comprising a single dimension value, wherein the processing unit being further configured to modify a value of a given tuple of the set of tuples stored in the memory by decreasing the value by said TA parameter.

3. The computing device of claim 1, further comprising a fifth input, configured to receive a conditioning (CD) parameter comprising a single dimension value, wherein each item stored in the memory having the set of tuples <key, value, depth> and wherein the processing unit being further configured to modify a depth value of the tuples for the selection of compared items by a magnitude defined as an addition or subtraction of the value of said CD parameter.

4. The computing device of claim 1, further comprising a second output, configured to provide a confidence (CF) parameter, the CF parameter being computed, by the processing unit, as a statistical grouping function over the similarity measures of said selection.

5. The computing device of claim 1, further comprising a third output, configured to provide a coherence (CH) parameter, the CH parameter being computed, by the processing unit, as a similarity measure between the second input signal and the first output signal.

6. The computing device of claim 2, further comprising a sixth input (116), configured to receive a focus parameter (AF) that relates to a filtering criteria, wherein the processing unit being further configured to modify the first output signal based on said filtering criteria of the AF parameter.

7. The computing device of claim 1, wherein the first input signal is received from another FCN or from a remote sensor or actuator.

8. The computing device of claim 2, further comprising a fifth input, a second output, or both, wherein the fifth input is configured to receive a conditioning (CD) parameter comprising a single dimension value, wherein each item stored in the memory having the set of tuples <key, value, depth> and wherein the processing unit being further configured to modify a depth value of the tuples for the selection of compared items by a magnitude defined as an addition or subtraction of the value of said CD parameter, and wherein the second output is configured to provide a confidence (CF) parameter, the CF parameter being computed, by the processing unit, as a statistical grouping function over the similarity measures of said selection.

9. The computing device of claim 8, wherein the first input signal is received from another FCN or from a remote sensor or actuator.

10. The computing device of claim 2, wherein the first input signal is received from another FCN or from a remote sensor or actuator.

11. A computer-implemented method for learning procedures for a computing device comprising a first fractal cognitive computing node (FCN), the method comprising:

receiving, by a first input of a first computing node, a first input signal comprising a first set of pairs <key, value>, a key of the first set of pairs representing an identifier and a value of the first set of pairs representing a magnitude of the first input signal;

receiving, by a second input of said first computing node of the FCN, a second input signal comprising a second set of pairs <key, value>, a key of the second set of pairs representing an identifier and a value of the second set of pairs representing a magnitude of the second input signal, the second input signal being an output signal of another computing node;

receiving, by a third input of the first computing node, a spatial attention, (SA) parameter comprising a single dimension value;

implementing, by a processing unit comprising one or more processors of the first computing node, a computational function that:

compares the first input signal or the second input signal or a combination of said first and second input signals to some or all of a collection of items stored in a memory of the first computing node, each item having a set of tuples <key, value>, and each item representing a previously stored input from at least one of said first or second input signals; and calculates a similarity measure for each compared item; and outputting, by an output of the first computing node, a first output signal comprising a third set of pairs <key, value>, the first output signal being calculated as a selection of the compared items having a similarity measure greater than said SA parameter;

wherein when the selection of compared items is empty, a new item is added to said memory and the set of tuples <key, value> of the new item and the first output signal to the first input signal or to the second input signal or to a combination of the first and second input signals, wherein when the selection of compared items is not empty, the first output signal is set to said selection, and wherein the method further comprises creating a new computing node by:

replicating at least one of the items stored in the memory of the first computing node in the new computing node; and connecting a first output of the new computing node to the first input of the first computing node and a second input of the new computing node to the first output of the first computing node, and wherein at least two FCNs connected to each other form a Computational Cognition Cluster having a hierarchical structure, the method further comprising:

receiving, by a first input of the Computational Cognition Cluster, a first input signal from an output of a children Computational Cognition Cluster, said first input signal comprising a compositional signal of tuples;

providing, by an output of the Computational Cognition Cluster, a signal to a parent Computational Cognition Cluster via a first input of the parent Computational Cognition Cluster;

receiving, by a second input of the Computational Cognition Cluster, a second input signal from an output of the parent Computational Cognition Cluster; and receiving, by a third input of the Computational Cognition Cluster, a conditioning (CD) parameter comprising a single dimension value.

12. The method of claim 11, further comprising:

receiving, by a fourth input of the first computing node, a temporal attention (TA) parameter comprising a single dimension value; and modifying, by the processing unit, a value of a given tuple of the set of tuples stored in the memory by decreasing the value of the given tuple by said TA parameter.

13. The method of claim 11, further comprising:

receiving, by a fifth input of the first computing node, a conditioning (CD) parameter comprising a single dimension value;

each item stored in the memory having the set of tuples <key, value, depth>; and modifying, by the processing unit, the depth value of the tuples for the selection of compared items by a magnitude defined as an addition or subtraction of the value of said CD parameter.

14. The method of claim 11, further comprising:

receiving, by a sixth input of the first computing node, a focus parameter (AF) relating to a filtering criteria; and modifying, by the processing unit, the first output signal based on said filtering criteria of the AF parameter.

15. The method of claim 11, further comprising:

computing, by the processing unit, a confidence (CF) parameter, as a statistical grouping function over the similarity measures of said selection; and providing the computed CF parameter via a second output of the first computing node.

16. The method of any of claim 11, further comprising:

computing, by the processing unit, a coherence (CF) parameter, as a similarity measure between the second input signal and the first output signal; and providing the computed CH parameter via a third output of the first computing node.

17. The method of claim 11, wherein the first input signal is received from another computing node or from a remote sensor or actuator.

18. A Computational Cognition Architecture, said Computational Cognition Architecture comprising a hierarchical structure formed by at least two Computational Cognition Clusters, as defined in claim 11, connected to each other, wherein the Computational Cognition Architecture further comprises:

a first input, configured to receive a first input signal, said first input signal comprising a compositional signal of tuples;

an output, configured to project to a domain; and a second input, configured to receive a domain conditioning parameter comprising a single dimension value.

\* \* \* \* \*